(12) United States Patent
Cypher

(10) Patent No.: US 8,484,438 B2
(45) Date of Patent: Jul. 9, 2013

(54) HIERARCHICAL BLOOM FILTERS FOR FACILITATING CONCURRENCY CONTROL

(75) Inventor: Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 527 days.

(21) Appl. No.: 12/493,523

(22) Filed: Jun. 29, 2009

(65) Prior Publication Data
US 2010/0332765 A1 Dec. 30, 2010

(51) Int. Cl.
*G06F 12/00* (2006.01)
*G06F 13/00* (2006.01)
*G06F 13/28* (2006.01)

(52) U.S. Cl.
USPC ........... 711/216; 711/147; 711/148; 711/149; 711/150; 711/151; 711/167; 711/168; 711/169

(58) Field of Classification Search
None
See application file for complete search history.

(56) References Cited

U.S. PATENT DOCUMENTS

| | | | |
|---|---|---|---|
| 7,702,683 B1* | 4/2010 | Kirshenbaum | 707/758 |
| 2006/0072582 A1* | 4/2006 | Bronnimann et al. | 370/395.32 |
| 2007/0198979 A1* | 8/2007 | Dice et al. | 718/100 |
| 2008/0243800 A1* | 10/2008 | Beyer et al. | 707/3 |
| 2009/0183159 A1* | 7/2009 | Michael et al. | 718/101 |

\* cited by examiner

*Primary Examiner* — Yaima Campos
(74) *Attorney, Agent, or Firm* — Park, Vaughan, Fleming & Dowler, LLP; Chia-Hsin Suen

(57) ABSTRACT

Some embodiments provide a system that facilitates concurrency control in a computer system. During operation, the system generates a set of signatures associated with memory accesses in the computer system. To generate the signatures, the system creates a set of hierarchical Bloom filters (HBFs) corresponding to the signatures, and populates the HBFs using addresses associated with the memory accesses. Next, the system compares the HBFs to detect a potential conflict associated with the memory accesses. Finally, the system manages concurrent execution in the computer system based on the detected potential conflict.

14 Claims, 6 Drawing Sheets

HIERARCHICAL BLOOM FILTERS FOR FACILITATING CONCURRENCY CONTROL

BACKGROUND

1. Field

The present embodiments relate to techniques for facilitating concurrency control in computer systems. More specifically, the present embodiments relate to a method and system for determining memory access conflicts during concurrent execution using hierarchical Bloom filters (HBFs).

2. Related Art

Computer system designers are presently developing mechanisms to support multi-threading within the latest generation of Chip-Multiprocessors (CMPs) as well as more traditional Symmetric Multiprocessors (SMPs). With proper hardware support, multi-threading can dramatically increase computational performance. However, as microprocessor performance continues to increase, the time spent synchronizing between threads (processes) is becoming a large fraction of overall execution time. In fact, as multi-threaded applications begin to use even more threads, this synchronization overhead often becomes the dominant factor in limiting application performance.

From a programmer's perspective, synchronization is typically accomplished through the use of locks. A lock is usually acquired before a thread enters a critical section of code, and is released after the thread exits the critical section. If another thread wants to enter a critical section protected by the same lock, it must acquire the same lock. If it is unable to acquire the lock, because a preceding thread has acquired the lock, the thread must wait until the preceding thread releases the lock. (Note that a lock can be implemented in a number of ways, such as through atomic operations or semaphores.)

Unfortunately, the process of acquiring a lock and the process of releasing a lock can be very time-consuming in modern microprocessors. They typically involve atomic operations, which flush load and store buffers, and can consequently require hundreds, if not thousands, of processor cycles to complete.

Alternatively, synchronization between concurrently executing/threads may involve the use of other types of concurrency control mechanisms such as transactional execution of critical sections. Changes made during transactional execution of the critical section may not be committed to the architectural state of the processor until the transactional execution successfully completes. Furthermore, an executing transaction may not commit if a conflict is detected with a concurrently executing thread. Hence, transactional execution may boost performance by facilitating multithreading and/or multiprocessing while avoiding the overhead associated with lock-based synchronization of threads.

To detect conflicts between concurrently executing threads (or transactions), a concurrency control mechanism may generate read set signatures and write set signatures corresponding to the read sets and write sets of two or more concurrently executing threads. A conflict may occur when the same address appears in the write set signatures of two different threads and/or in the write set signature of one thread and the read set signature of another thread.

Read and write signatures may be created using Bloom filters, which store memory addresses associated with reads and writes by mapping the memory addresses to a bit array using one or more hash functions. In this way, a Bloom filter provides a compact representation of a read or write set of a thread. Moreover, conflicts between threads may be quickly detected by examining the bitwise intersection between two Bloom filters. Thus, Bloom filters may provide space and time advantages over other structures for representing read and write sets, such as linked lists, hash tables, or search trees. However, a Bloom filter may produce false positives, and such false positives may increase in frequency as elements are added to the Bloom filter. Consequently, conflict detection using Bloom filters may become unwieldy or inaccurate as read and write set signatures grow in size and complexity.

Hence, what is needed is a technique that efficiently and accurately detects conflicts in concurrently executing threads without the disadvantages of existing techniques.

SUMMARY

The described embodiments provide a system that facilitates concurrency control in a computer system. During operation, the system generates a set of signatures associated with memory accesses in the computer system. To generate the signatures, the system creates a set of hierarchical Bloom filters (HBFs) corresponding to the signatures, and populates the HBFs using addresses associated with the memory accesses. Next, the system compares the HBFs to detect a potential conflict associated with the memory accesses. Finally, the system manages concurrent execution in the computer system based on the detected potential conflict.

In some embodiments, each of the HBFs includes a higher-level Bloom filter and a set of lower-level Bloom filters referenced using array positions in the higher-level Bloom filter.

In some embodiments, a subset of the lower-level Bloom filters is further referenced using array positions in other lower-level Bloom filters.

In some embodiments, comparing the HBFs to detect the potential conflict involves obtaining a bitwise intersection of two of the HBFs and examining array positions in the bitwise intersection for nonzero values.

In some embodiments, the higher-level Bloom filter and the lower-level Bloom filters include at least one of a one-dimensional Bloom filter and a two-dimensional Bloom filter.

In some embodiments, populating the HBFs with the memory accesses involves:
 (i) calculating a first set of hash values associated with the higher-level Bloom filter using the addresses;
 (ii) calculating a second set of hash values associated with the lower-level Bloom filters based on the first set of hash values; and
 (iii) setting bits in the lower-level Bloom filters corresponding to the second set of hash values.

In some embodiments, comparing the HBFs involves at least one of comparing two write set signatures and comparing a read set signature and a write set signature.

In some embodiments, managing concurrent execution in the computer system involves managing transactional execution in the computer system.

BRIEF DESCRIPTION OF THE FIGURES

In the figures, like reference numerals refer to the same figure elements.

DETAILED DESCRIPTION

Figure 1A:
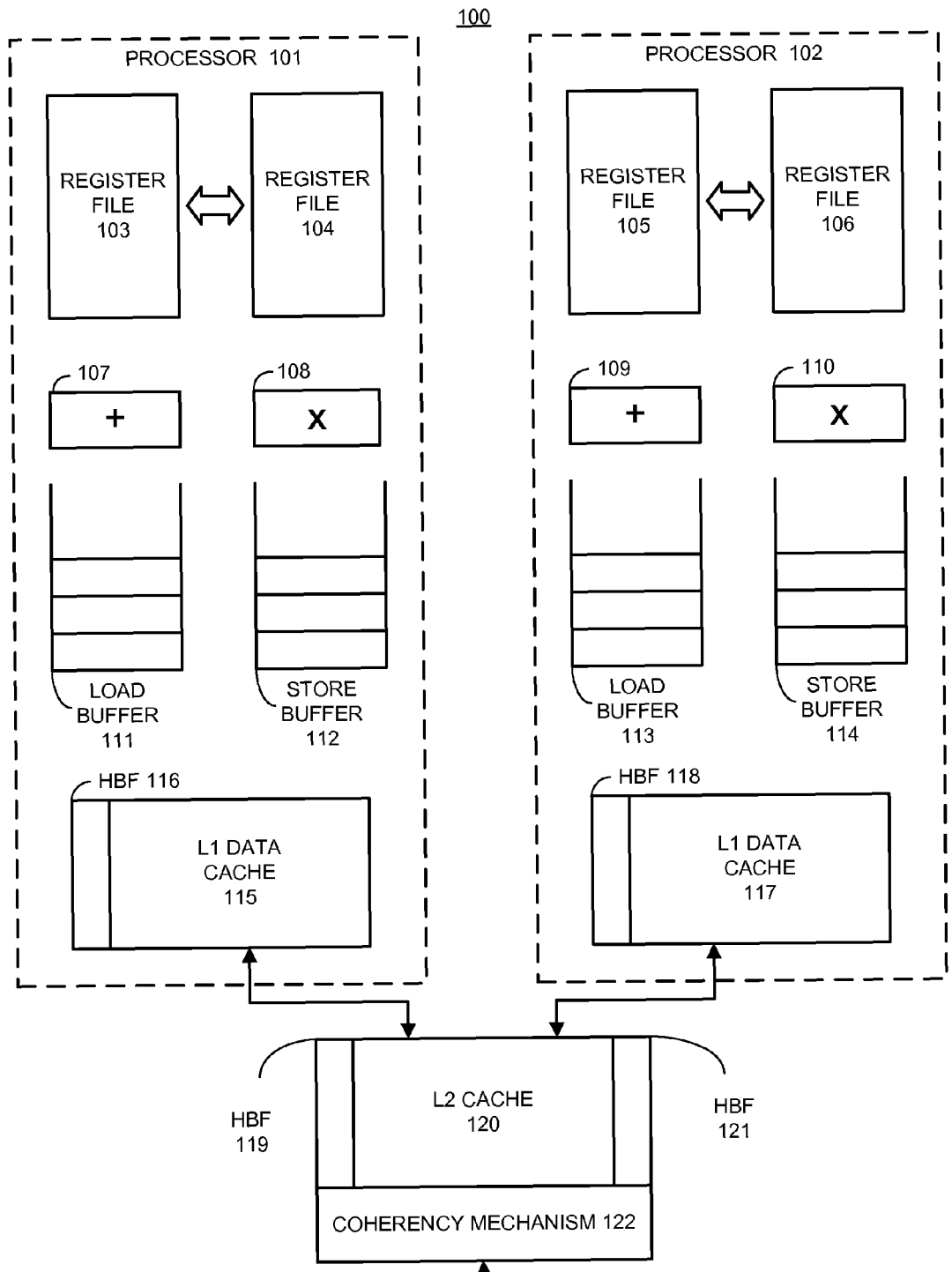
FIG. 1A shows a computer system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating concurrency control in a computer system. More specifically, embodiments provide a method and system for efficiently detecting conflicts in concurrently executing threads in the computer system. The conflicts may be detected using hierarchical Bloom filters (HBFs) that reduce the false positive rate associated with conventional Bloom filters. Each HBF may include a higher-level Bloom filter with array positions that reference a set of lower-level Bloom filters. Additional references may also exist between lower-level Bloom filters. In other words, the HBF may correspond to a layered hierarchy of Bloom filters, with each Bloom filter accessed through a reference from a higher-level Bloom filter.

Conflicts may be detected by obtaining the bitwise intersection of two HBFs and examining array positions in the bitwise intersection for nonzero values. If at least one column of the higher-level Bloom filter in the bitwise intersection is empty, no conflict is found. On the other hand, a potential conflict may be found if each column of the higher-level Bloom filter contains at least one non-empty array position. Moreover, emptiness of an array position in the higher-level Bloom filter may be recursively determined by examining the emptiness of all lower-level Bloom filters referenced from the array position. For example, the array position is determined to be empty if the lower-level Bloom filter referenced by the array position is defined as empty (e.g., based on bits set in the lower-level Bloom filter and/or through additional references to other lower-level Bloom filters).

The potential conflict may then be used to manage concurrent execution in the computer system. For example, a transaction may be committed if no conflict is found between the transaction and other concurrently executing threads. On the other hand, the transaction may be aborted if a potential conflict is detected between the transaction and other concurrently executing threads. As another example, cache coherence for non-transactional code may be provided by grouping successive loads and stores into blocks and using HBFs to detect conflicts between blocks.

FIG. 1A illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As shown in FIG. 1A, computer system 100 includes processors 101-102 and level 2 (L2) cache 120, which is coupled to main memory (not shown). Processors 101-102 may be used to concurrently execute applications on computer system 100. Moreover, processors 101-102 may provide mechanisms to support multiprocessing, transactional execution, cache coherence, and concurrency control. Processors 101-102 may be physically separated from one another (e.g., on separate physical packages) or integrated onto a single integrated circuit die (e.g., as independent cores). Processor 102 is similar in structure to processor 101, so only processor 101 is described below.

Processor 101 includes two register files 103 and 104, one of which is an "active register file" and the other of which is a backup "shadow register file." In one or more embodiments, processor 101 provides a flash copy operation that instantly copies all of the values from register file 103 into register file 104. This facilitates a rapid register checkpointing operation to support transactional execution of a program on processor 101. Other embodiments that do not require such flash copy operations are known in the art and thus are not described here.

Processor 101 also includes one or more functional units, such as adder 107 and multiplier 108. These functional units may be used in performing computational operations involving operands retrieved from register files 103 or 104. As in a conventional processor, load and store operations may pass through load buffer 111 and store buffer 112.

Processor 101 additionally includes a level one (L1) data cache 115, which stores data items that are likely to be used by processor 101. Processor 101 also includes an L1 instruction cache (not shown). L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122. Coherency mechanism 122 may contain information about the contents of caches and may provide a facility for communicating or forwarding requests between processors and caches. In other words, coherency mechanism 122 may support cache coherence for processors 101-102 and L1 data caches 115-117, such as directory-based coherence and/or bus snooping.

In one or more embodiments, coherency mechanism 122 includes functionality to detect potential conflicts between concurrently executing threads in processors 101-102. The potential conflicts may be used to manage concurrent execution in computer system 100. For example, conflicts may occur when memory accesses to the same address are made by concurrently executing transactions on processors 101-102. Such conflicts may cause some or all of the transactions to fail; the failed transaction(s) may then be retried until no conflicting memory accesses occur and the transaction(s) can be committed to the architectural state of one or more processors 101-102. Along the same lines, potential conflicts between data stored in L1 data cache 115 and L1 data cache 117 may be managed by coherency mechanism 122 to ensure that changes to data in one L1 data cache are propagated to the other L1 data cache in a timely fashion.

To detect potential conflicts, concurrency control mechanisms may store read and write set signatures for processors 101-102 in Bloom filters for rapid and efficient conflict detection. Each Bloom filter may store hash values representing addresses associated with a read or write set signature in a bit array. In particular, the Bloom filter may correspond to a bit array with all bits initialized to 0. When an address is added to the Bloom filter, the address is hashed to one or more array positions in the bit array, which are set to 1 to store the address. Furthermore, the Bloom filter may be one-dimensional or two-dimensional As a result, n hash values may be stored in n array positions of a one-dimensional Bloom filter, or n hash values may be stored in n different columns of a two-dimensional Bloom filter. For example, a one-dimensional Bloom filter with 128 bit positions and eight hash functions may map each address associated with a signature to eight hash values and store the hash values in a one-dimensional array with 128 elements. On the other hand, a two-dimensional array of the same size and number of hash functions may store each of eight hash values for an address in a separate column of a two-dimensional array with 16 rows and eight columns.

Conflicts between signatures may then be detected by computing a bitwise intersection between two Bloom filters storing the signatures and examining array positions in the bitwise intersection for nonzero values. If one-dimensional Bloom filters are used to store the signatures, a potential conflict may be found if any array position in the bitwise intersection is set to 1. If two-dimensional Bloom filters are used, a potential conflict may be found if all columns of the bitwise intersection contain at least one nonzero array position. On the other hand, if the bitwise intersection contains a column with all zeros (e.g., all array positions in a one-dimensional Bloom filter or one or more columns in a two-dimensional Bloom filter), no intersection exists between the signatures and no conflict is found.

As a result, Bloom filters may produce false positives but not false negatives in detecting potential conflicts between concurrently executing threads. Such false positives may be caused by collisions in hash values stored in the Bloom filters. For example, a set membership test using a Bloom filter with 15 times more array positions than elements and seven hash functions may have a false positive rate of 0.001. In addition, conflict detection between two signatures may be associated with an even higher false positive rate because potential conflicts may be represented by the bitwise intersection of two Bloom filters corresponding to the signatures. As a result, Bloom filters provide a suboptimal solution for detecting potential conflicts in concurrently executing threads, particularly as the Bloom filters are used to store increasingly large or complex sets of memory accesses.

To reduce the false positive rate associated with Bloom filters while maintaining rapid and efficient comparison of signatures, coherency mechanism 122 may utilize hierarchical Bloom filters (HBFs) (e.g., HBFs 116, 118, 119, and 121). Each HBF may include a set of Bloom filters arranged in layers and/or levels. A higher-level Bloom filter may include array positions that reference a set of lower-level Bloom filters. Additional levels may be created by further referencing lower-level Bloom filters using array positions in other lower-level Bloom filters. The higher-level Bloom filter and lower-level Bloom filters may include both one-dimensional and two-dimensional Bloom filters.

A read or write set signature associated with an executing thread may be created using an HBF by calculating a first set of hash values associated with the higher-level Bloom filter. The first set of hash values may be used to calculate additional sets of hash values associated with lower-level Bloom filters. Bits in the lower-level Bloom filters may then be set using the additional sets of hash values. The process of generating signatures using HBFs is discussed in further detail below with respect to FIGS. 2A-2B.

In one or more embodiments, HBFs 116 and 118 correspond to read set signatures of threads executing on processors 101-102 and may be created using cache lines in L1 caches 115 and 117, while HBFs 119 and 121 correspond to write set signatures of the threads and may be created using cache lines in L1 caches 115 and 117 or L2 cache 120. For example, HBFs 116 and 119 may correspond to a read set signature and write set signature, respectively, for a thread executing on processor 101, while HBFs 118 and 121 may correspond to a read set signature and write set signature, respectively, for a thread executing on processor 102. HBFs 116 and 118 may be stored in the respective L1 caches 115 and 117, while HBFs 119 and 121 may be stored in L2 cache 120. Alternatively, HBFs 116, 118, 119, and 121 may be located in storage that is separate from the caches and/or processors 101-102.

Potential conflicts between memory accesses in concurrently executing threads may be detected by comparing the HBFs storing the memory accesses. To compare the HBFs, coherency mechanism 122 may obtain a bitwise intersection of the HBFs and examine array positions in the bitwise intersection for nonzero values. If any column of the higher-level Bloom filter in the bitwise intersection is empty (e.g., only references lower-level Bloom filters that are defined to be empty), no conflict is found. For example, the bitwise intersection may include a two-dimensional higher-level Bloom filter that references a number of two-dimensional lower-level Bloom filters. If all lower-level Bloom filters referenced by one column of the higher-level Bloom filter include at least one empty column of array positions, no conflict is found in the bitwise intersection. Otherwise, if all columns of the higher-level Bloom filter reference at least one nonempty lower-level Bloom filter, a potential conflict may be found. Conflict detection using HBFs is discussed in further detail below with respect to FIG. 2C.

Figure 1B:
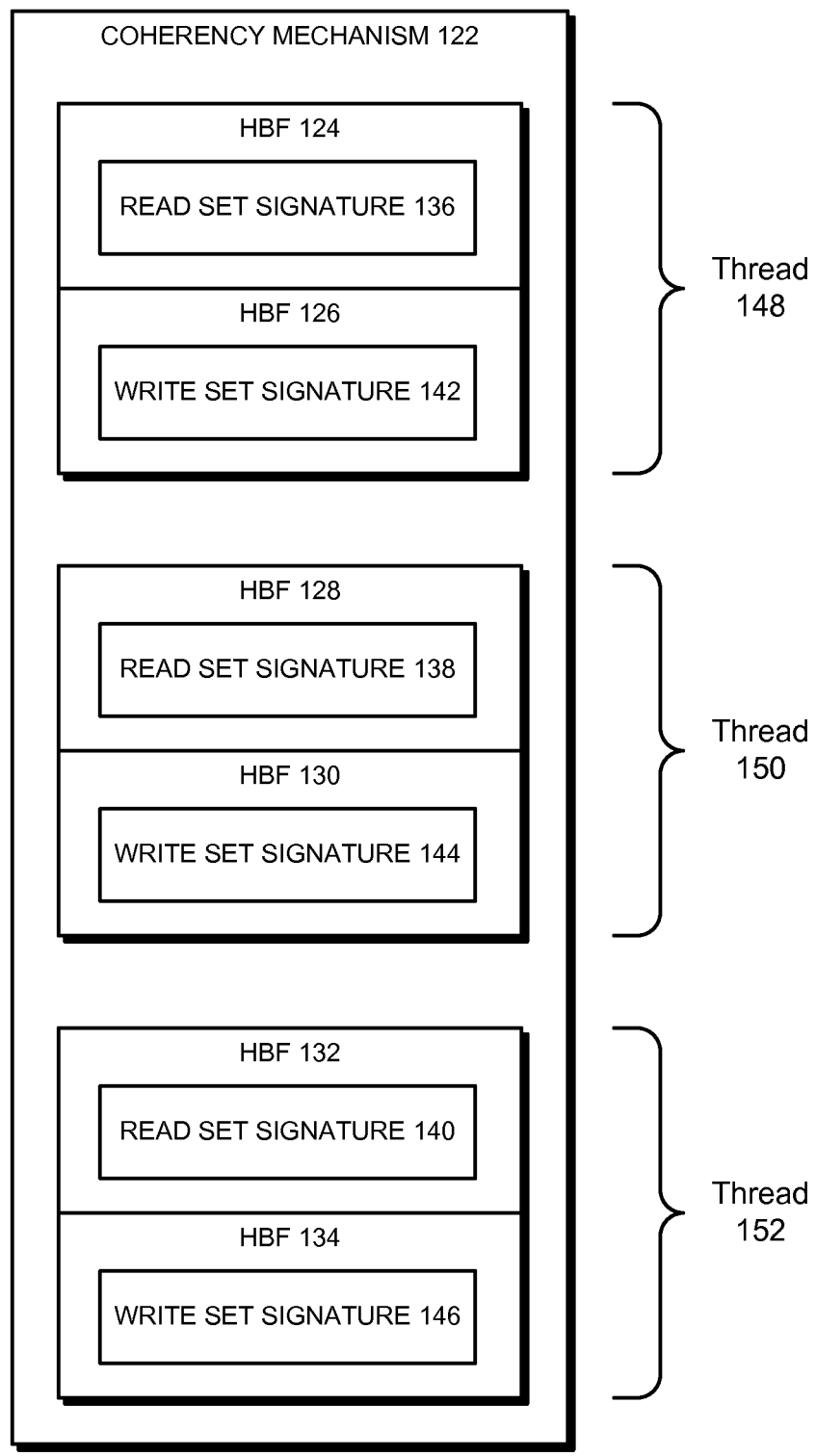
FIG. 1B shows a coherency mechanism in accordance with an embodiment.

FIG. 1B shows coherency mechanism 122 in accordance with an embodiment. As described above, coherency mechanism 122 may detect potential conflicts between memory accesses of concurrently executing threads 148-152. Coherency mechanism 122 may be implemented as a part of a multi-core processor on which threads 148-152 execute (e.g., processors 101-102 of FIG. 1A), or coherency mechanism 122 may be provided by an integrated circuit coupled to one or more processors. Coherency mechanism 122 may further provide instructions executed on one or more processors to determine if potential conflicts have occurred between threads 148-152.

To detect the potential conflicts, coherency mechanism 122 may obtain a read set signature 136-140 and a write set signature 142-146 for each thread 148-152. Each read set signature 136-140 and write set signature 142-146 may be represented using a corresponding HBF 124-134. HBFs 124-134 may be stored in a storage apparatus associated with coherency mechanism 122, such as a processor cache and/or storage that is physically separate from the processor(s). As mentioned previously, HBFs containing read set signatures 136-140 may be created from and/or stored in L1 caches of the processors, while HBFs containing write set signatures 142-146 may be created from and/or stored in L1 or L2 caches associated with the processors. Furthermore, an HBF 124-134 for a thread 148-152 may be updated as reads or writes are made to the corresponding cache by the thread, or HBFs 124-134 may be created after two or more threads 148-152 have finished concurrent execution (e.g., transactional execution).

To create a read set signature 136-140 for a thread 148-152, an HBF may be populated with memory accesses associated with reads made by the thread. To create a write set signature 142-146 for a thread 148-152, an HBF may be populated with memory accesses associated with writes made by the thread. Coherency mechanism 122 may then detect potential conflicts between threads 148-152 by obtaining HBFs 124-134 from their respective storage mechanisms (e.g., L1 caches, L2 cache, external storage) and comparing pairs of HBFs 124-134 containing two write set signatures 142-146 and/or one read set signature 136-140 and one write set signature 142-146. Alternatively, coherency mechanism 122 may coordinate the transmission of HBFs for concurrently executing threads 148-152 between processors executing the threads for conflict detection and management on the processor level.

To compare pairs of HBFs 124-134, the bitwise intersection of each pair may be obtained and array positions in the bitwise intersection examined for nonzero values. If the bitwise intersection includes a higher-level Bloom filter with an empty column of array positions, no conflict is found. However, if a potential conflict is found (e.g., the higher-level Bloom filter of the bitwise intersection does not have an empty column), the potential conflict may be used to manage the execution of one or more threads 148-152.

For example, coherency mechanism 122 may be used to facilitate conflict detection between transactions concurrently executed by threads 148-150 on separate processors. Each transaction may be a software-specified transaction or a hardware-defined set of consecutive instructions in program order. To execute a transaction, each processor may checkpoint its register state, place its stores in a corresponding store queue and/or other buffer for speculative stores (e.g., a L1 data cache), and use HBFs to record the transaction's read and write sets. After the transaction has completed execution, the HBF containing the transaction's read set signature is sent to coherency mechanism 122, which orders the HBF with respect to HBFs from other processors, and broadcasts the HBF to the other processors.

When a processor receives an HBF from coherency mechanism 122, the processor checks for a potential conflict with its own HBFs representing its own read and writes set signatures. If a potential conflict is detected, the processor fails its current transaction, clears its current HBFs, and restores its checkpointed register state. The processor may also check for lines in its L1 data cache that could match lines in the received HBF and invalidates all such lines to maintain coherence of the L1 data cache. Such detection of potential matching of lines in the L1 data cache and the received HBF may be implemented by performing a sequence of membership queries of lines in the L1 data cache against the received HBF. Finally, the original processor from which the HBF was obtained may receive an acknowledgment from coherency mechanism 122 that all conflicts have been detected and resolved, at which point the original processor can commit its transaction and continue execution.

Figure 2A:
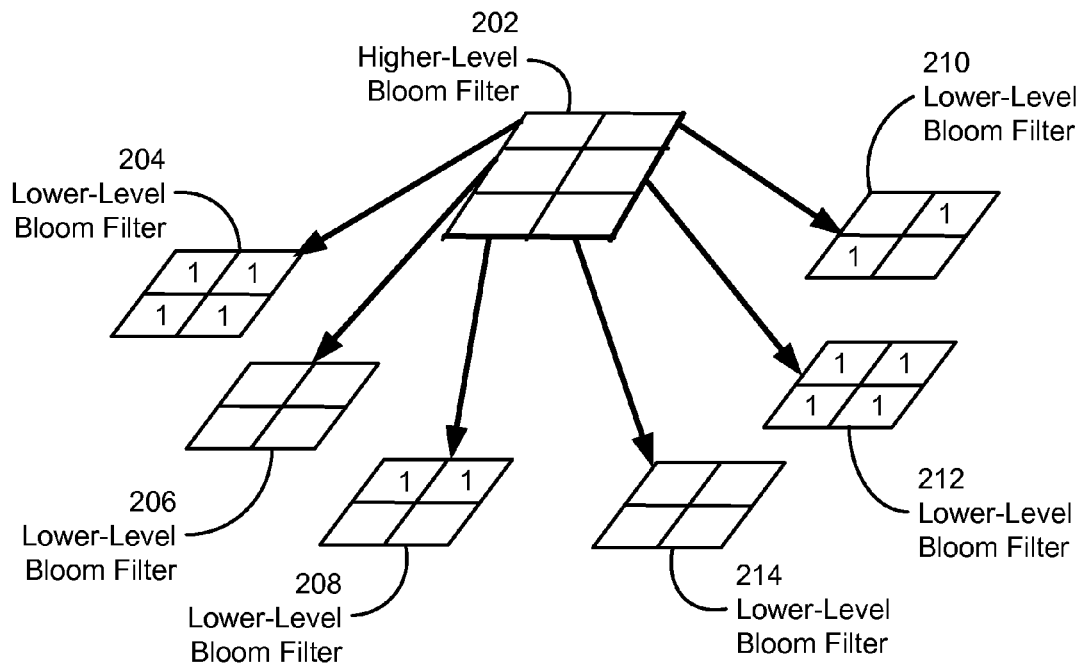
FIG. 2A shows an exemplary hierarchical Bloom filter in accordance with an embodiment.

FIG. 2A shows an exemplary HBF in accordance with an embodiment. As discussed above, the HBF may be used to store a signature (e.g., read set signature, write set signature) associated with a set of memory accesses. The HBF may then be compared to other HBFs to detect potential conflicts between the HBFs. As shown in FIG. 2A, the HBF includes a higher-level Bloom filter 202 and a set of lower-level Bloom filters 204-214. Higher-level Bloom filter 202 includes six array positions arranged in two columns and three rows. Each array position of higher-level Bloom filter 202 references one of six lower-level Bloom filters 204-214, each with four array positions arranged in two columns and two rows.

In other words, the HBF of FIG. 2A includes two levels, with the higher level composed of higher-level Bloom filter 202 and the lower level composed of lower-level Bloom filters 204-214 referenced by array positions in higher-level Bloom filter 202. Alternatively, the HBF may include more than two levels. For example, each of the four array positions in one or more lower-level Bloom filters 204-214 may additionally reference four other lower-level Bloom filters (not shown) at a level below lower-level Bloom filters 204-214.

In one or more embodiments, array positions in the HBF are initialized to all zeros. To populate the HBF with memory accesses, a first set of hash values associated with higher-level Bloom filter 202 may be calculated using an address for each memory access. For example, higher-level Bloom filter 202 may include two hash functions, one for each column of higher-level Bloom filter 202. As a result, two hash values associated with higher-level Bloom filter 202 may be obtained for each memory access stored in the HBF. The first set of hash values may then be used to calculate a second set of hash values associated with lower-level Bloom filters 204-214, which are stored in lower-level Bloom filters 204-214 by setting the respective array positions in each lower-level Bloom filter 204-214 to 1.

In particular, the first set of hash values may determine which lower-level Bloom filters 204-214 are used to store bits corresponding to the memory access. For example, a memory access with a first set of hash values in higher-level Bloom filter 202 corresponding to the first row of the first column and the second row of the second column may be stored in the HBF as bits in lower-level Bloom filter 204 and lower-level Bloom filter 212. Furthermore, the bits may be calculated as a second set of hash values using hash functions associated with lower-level Bloom filter 204 and lower-level Bloom filter 212.

Consequently, multiple memory accesses may be stored in the HBF by calculating the hash values for higher-level Bloom filter 202 using addresses associated with the memory accesses and then using the hash values to index into lower-level Bloom filters 204-214. As shown in FIG. 2A, the HBF may contain at least three memory accesses because at least three different sets of hash values are stored in the HBF (e.g., all bits set in lower-level Bloom filter 204 and lower-level Bloom filter 212 and two bits set in lower-level Bloom filters 208-210). More specifically, each set of hash values for a memory access may correspond to a bit set in each column of one lower-level Bloom filter 204-214 referenced by each column of higher-level Bloom filter 202. In other words, two bits in each of two lower-level Bloom filters 204-214 (e.g., four bits overall) may be set for each memory access stored in the HBF.

Because only bits in lower-level Bloom filters 204-214 are set, storage required for the HBF may only be allocated for six lower-level Bloom filters 204-214 with four bits each (e.g., 24 bits). Array positions for higher-level Bloom filter 202 may only serve as indexes into the offsets of lower-level Bloom filters 204-214. As a result, the HBF may maintain the storage and efficiency advantages of conventional Bloom filters while significantly reducing the false positive rate associated with conventional Bloom filters. For example, up to fourteen different hash functions may be used in the HBF of FIG. 2A. In addition, collisions may only occur if a memory access produces the same hash values for both higher-level Bloom filter 202 and lower-level Bloom filters 204-214 as one or more other memory accesses stored in the HBF. On the other hand, a conventional Bloom filter of the same size as the HBF with six columns and four rows may only contain six hash functions. As bits are set for each memory access, the false positive rate for the conventional Bloom filter may increase more rapidly than for the HBF, since six bits are set in the conventional Bloom filter, versus four bits in the HBF.

Figure 2B:
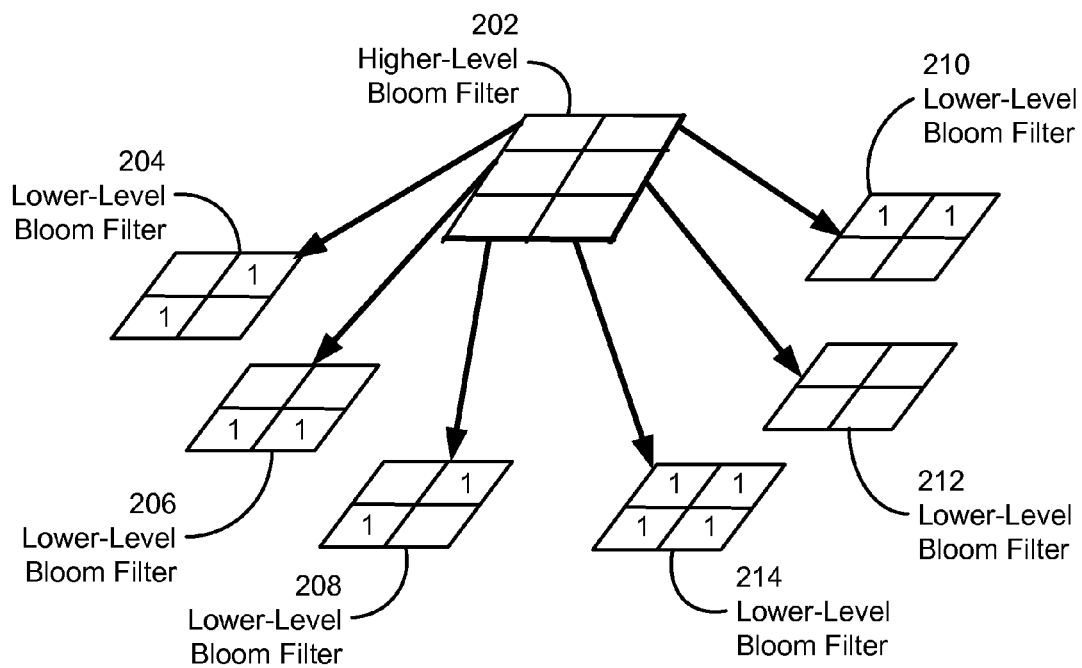
FIG. 2B shows an exemplary hierarchical Bloom filter in accordance with an embodiment.

FIG. 2B shows an exemplary HBF in accordance with an embodiment. More specifically, FIG. 2B shows the HBF of FIG. 2A with a different set of bits set in lower-level Bloom filters 204-214. In other words, the HBF of FIG. 2B may store a different read or write set signature than that of FIG. 2A. As shown in FIG. 2B, lower-level Bloom filters 204-210 each have two bits set, while all the bits of lower-level Bloom filter 214 are set. Because four bits are set for each memory access stored in the HBF, at least three memory accesses are also stored in the HBF of FIG. 2B.

Figure 2C:
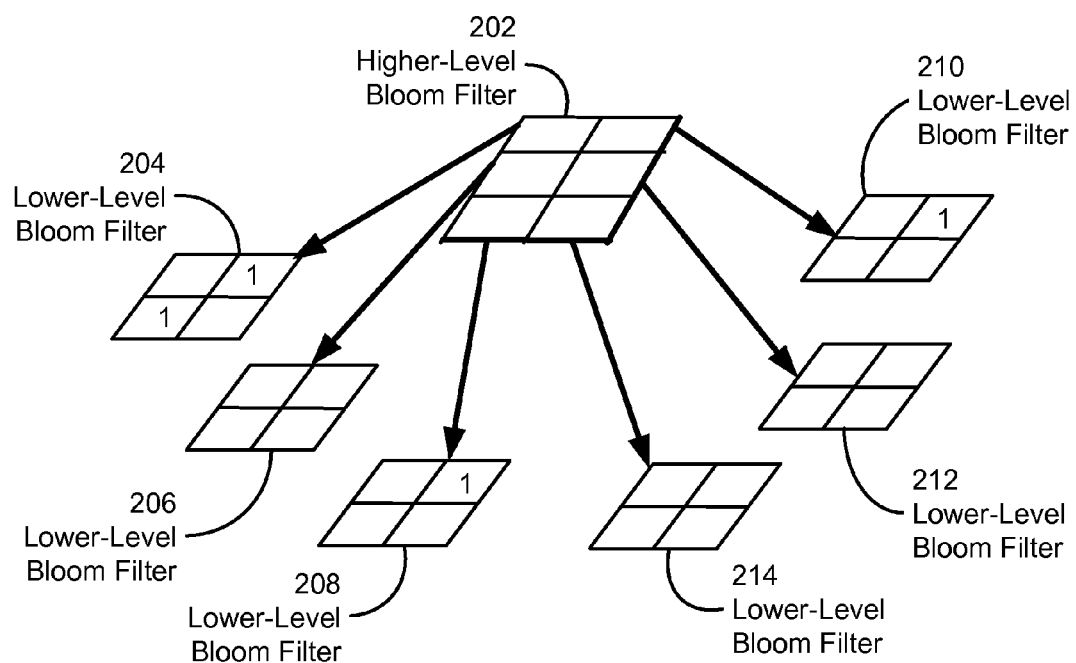
FIG. 2C shows an exemplary hierarchical Bloom filter in accordance with an embodiment.

Furthermore, the HBF of FIG. 2B may be compared with the HBF of FIG. 2A to detect a potential conflict associated with the memory accesses stored in both HBFs. As shown in FIG. 2C, the potential conflict may be detected by obtaining a bitwise intersection of the HBFs and examining array positions in the bitwise intersection for nonzero values.

FIG. 2C shows an exemplary HBF in accordance with an embodiment. In particular, FIG. 2C shows the bitwise intersection of the HBFs of FIGS. 2A-2B. As mentioned previously, the bitwise intersection may be calculated and examined to detect potential conflicts between memory accesses stored in the HBFs of FIGS. 2A-2B. The bitwise intersection may be obtained as the intersection of bits in lower-level Bloom filters 204-214 of the two HBFs. The HBF of FIG. 2C includes two bits set in lower-level Bloom filter 204, one bit set in lower-level Bloom filter 208, and one bit set in lower-level Bloom filter 210, indicating that the bitwise intersection of the HBFs of FIGS. 2A-2B is nonzero.

Although four bits are set in the bitwise intersection, no conflict is found between the memory accesses stored in the HBFs of FIGS. 2A-2B because lower-level Bloom filters 210-214, which are referenced by the second column of higher-level Bloom filter 202, are empty. More specifically, lower-level Bloom filters 212-214 contain all zeros, while lower-level Bloom filter 210 contains one nonempty bit but is empty by definition because one column contains all zeros. Because higher-level Bloom filter 202 contains an empty column as defined by the empty lower-level Bloom filters 210-214 referenced by array positions in the column, no intersection is found between the signatures stored in the HBFs of FIGS. 2A-2B. However, if nonzero values were stored in both columns of any lower-level Bloom filter 210- 214 referenced by the second column of higher-level Bloom filter 202, a potential conflict may be found in the signatures stored in the HBFs of FIGS. 2A-2B. For example, the bitwise intersection if FIG. 2C may represent a potential conflict in the signatures stored in the HBFs of FIGS. 2A-2B if one or more bits in the left column of lower-level Bloom filter 210 contained a nonzero value.

In other words, a potential conflict may be detected by examining higher-level Bloom filter 202 as a two-dimensional Bloom filter, with emptiness of each array position in the two-dimensional Bloom filter defined by the emptiness of the corresponding lower-level Bloom filter 204-214 referenced by the array position. On the other hand, if higher-level Bloom filter 202 were one-dimensional (e.g., included only one column), all array positions (e.g., lower-level Bloom filters 204-214) of higher-level Bloom filter 202 would have to be defined as empty for no conflict to be found.

Figure 3:
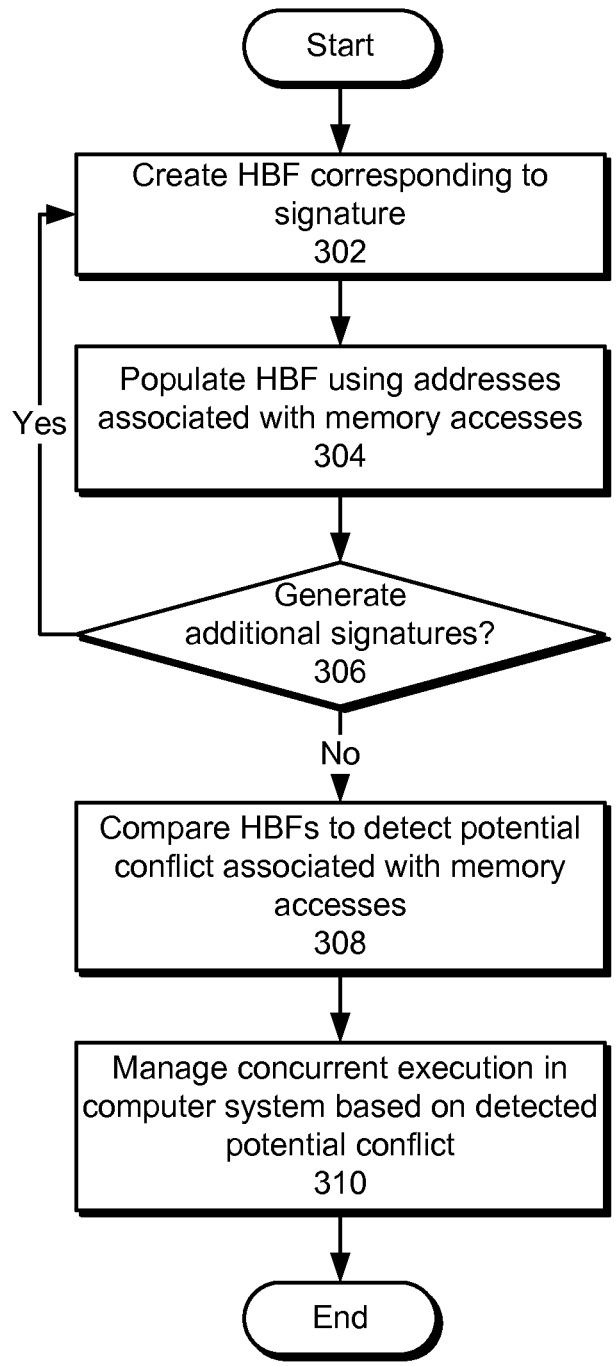
FIG. 3 shows a flowchart illustrating the process of facilitating concurrency control in a computer system in accordance with an embodiment.

FIG. 3 shows a flowchart illustrating the process of facilitating concurrency control in a computer system in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, an HBF corresponding to a signature in the computer system is created (operation 302). The signature may correspond to a read or write set signature of a thread executing in the computer system. The HBF may include a higher-level Bloom filter and a set of lower-level Bloom filters referenced using array positions in the higher-level Bloom filter. A subset of the lower-level Bloom filters may additionally be referenced by other lower-level Bloom filters. As a result, the HBF may correspond to a data structure that includes two or more "levels" or layers of one- and/or two-dimensional Bloom filters, with each lower-level Bloom filter referenced by an array position in a Bloom filter a level above the Bloom filter (e.g., the higher-level Bloom filter or another lower-level Bloom filter). Next, the HBF is populated using addresses associated with memory accesses in the signature (operation 304). For example, an HBF corresponding to a write set signature may be created by populating the HBF with addresses for memory accesses made during a set of write operations in the computer system.

Additional signatures may also be generated (operation 306). For example, a read set signature and a write set signature may be created for each of two or more concurrently executing threads in the computer system. If additional signatures are to be generated, HBFs corresponding to the signatures are created (operation 302) and populated with memory accesses (operation 304). Next, the HBFs are compared to detect a potential conflict associated with the memory accesses (operation 308). To detect a potential conflict, pairs of HBFs from two concurrently executing threads may be compared; each pair may correspond to two write set signatures or one read set signature and one write set signature.

In one or more embodiments, two HBFs are compared by obtaining a bitwise intersection of the HBFs and examining array positions in the bitwise intersection for nonzero values. No conflict is found if the higher-level Bloom filter in the HBF containing the bitwise intersection is empty (e.g., indicates no set intersection) by definition. A one-dimensional higher-level Bloom filter is empty only if each array position in the one-dimensional higher-level Bloom filter is empty, while a two-dimensional higher-level Bloom filter is empty if at least one column in the two-dimensional higher-level Bloom filter is empty.

Moreover, the emptiness of each array position in the higher-level Bloom filter may be defined by recursively determining the emptiness of one or more lower-level Bloom filters referenced by the array position. For example, an array position in the higher-level Bloom filter may reference a one-dimensional lower-level Bloom filter with four array positions, while each of the four array positions in the one-dimensional lower-level Bloom filter may subsequently reference one of four two-dimensional lower-level Bloom filters. The array position in the higher-level Bloom filter is defined as empty only if each array position in the one-dimensional lower-level Bloom filter referenced by the array position in the higher-level Bloom filter is empty. In turn, each array position in the one-dimensional lower-level Bloom filter is empty only if the corresponding two-dimensional lower-level Bloom filter includes at least one empty column. Consequently, the emptiness of the array position in the higher-level Bloom filter is dependent on the emptiness of the four lowest-level Bloom filters referenced from the array position.

Such nested referencing of Bloom filters in the HBF may significantly decrease the false positive rate associated with conventional Bloom filters while maintaining the space and efficiency advantages of conventional Bloom filters. The decrease in false positives may further facilitate the accurate and efficient management of concurrent execution (e.g., multiprocessing, cache coherence, transactional execution, etc.) in the computer system. For example, a reduced incidence of false positives in conflict detection may allow for better maintenance of consistency between multiple processor caches in the computer system.

Figure 4:
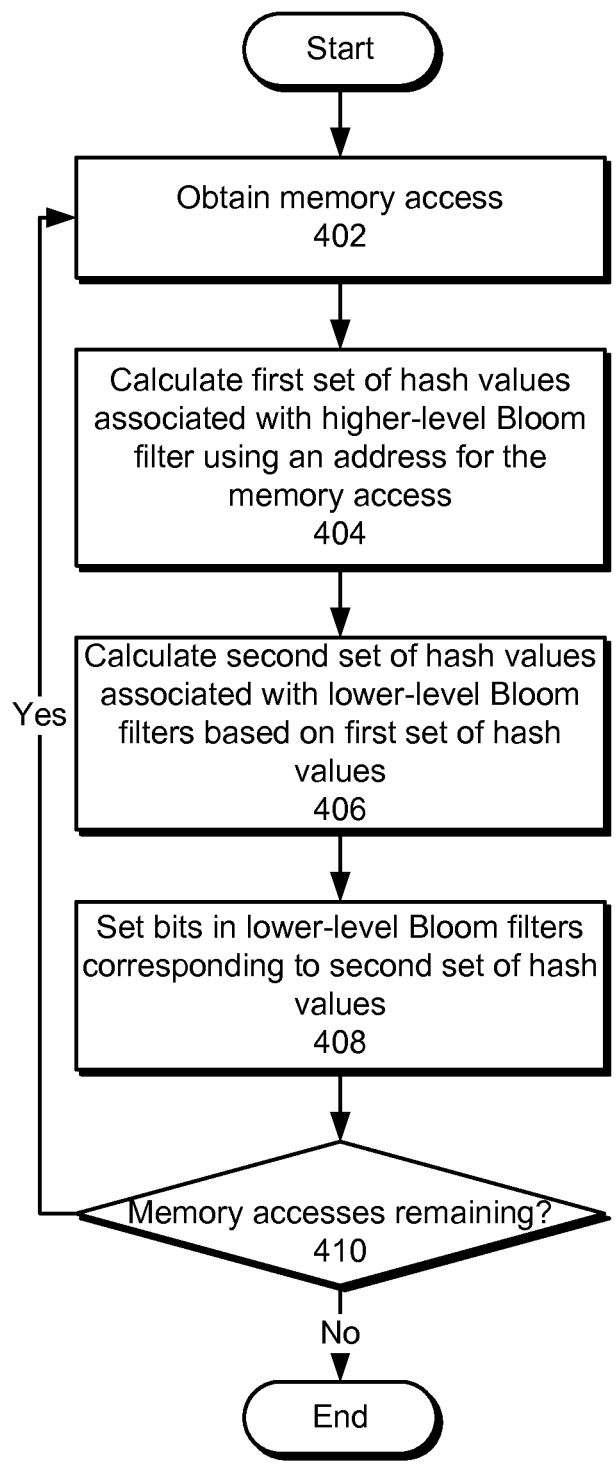
FIG. 4 shows a flowchart illustrating the process of populating a hierarchical Bloom filter in accordance with an embodiment.

FIG. 4 shows a flowchart illustrating the process of populating an HBF in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, a memory access is obtained (operation 402). The memory access may be a part of a read or write set signature to be stored in the HBF. Next, a first set of hash values associated with a higher-level Bloom filter in the HBF is calculated using an address for the memory access (operation 404). In particular, the first set of hash values may be calculated by providing the address for the memory access as input to a set of hash functions associated with the higher-level Bloom filter. The hash values may further correspond to array positions in the higher-level Bloom filter. For example, the higher-level Bloom filter may include four hash functions that map to four different columns of array positions. Each hash function may produce a hash value that represents an array position in the column to which the hash function maps.

A second set of hash values associated with lower-level Bloom filters in the HBF is then calculated based on the first set of hash values (operation 406). In one or more embodiments, the second set of hash values is calculated by determining the lower-level Bloom filters referenced by the first set of hash values and applying one or more hash functions in each of the referenced lower-level Bloom filters to the memory access. The second set of hash values may then be used to set bits in the lower-level Bloom filters (operation 408). On the other hand, if additional lower-level Bloom filters are referenced using the second set of hash values, additional sets of hash values may be calculated using hash functions associated with the additional lower-level Bloom filters until the lowest level of Bloom filters is reached and bits in the lowest level set.

Operations 402-408 may be repeated for remaining memory accesses (operation 410) associated with the signature stored in the HBF. For example, a read set signature may be associated with 100 memory accesses. Each memory access may be obtained (operation 402), sets of hash values may be calculated using the memory access (operations 404-406), and bits in the lowest level of the HBF corresponding to the hash values set (operation 408) until the HBF is populated with all 100 memory accesses. The HBF may then be compared to other HBFs containing signatures from concurrently executing threads to detect potential conflicts between the concurrently executing threads. Any detected potential conflicts may then be used to manage concurrent execution in the computer system, as described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating concurrency control in a computer system, comprising:
   generating a set of signatures associated with memory accesses in the computer system by:
   creating a set of hierarchical Bloom filters (HBFs) corresponding to the signatures, wherein the set of HBFs comprises a higher-level Bloom filter and a set of lower-level Bloom filters referenced using array positions in the higher-level Bloom filter; and
   populating the HBFs using addresses associated with the memory accesses, which comprises:
   calculating a first set of hash values using the addresses;
   using the first set of hash values to calculate a second set of hash values; and
   setting bits in the higher-level Bloom filters in accordance with the first set of hash values and setting the bits in the lower-level Bloom filters in accordance with the second set of hash values;
   comparing the HBFs to detect a potential conflict associated with the memory accesses; and
   managing concurrent execution in the computer system based on the detected potential conflict.

2. The computer-implemented method of claim 1, wherein a subset of the lower-level Bloom filters is further referenced using array positions in other lower-level Bloom filters.

3. The computer-implemented method of claim 1, wherein comparing the HBFs to detect the potential conflict involves:
   obtaining a bitwise intersection of two of the HBFs; and
   examining array positions in the bitwise intersection for nonzero values.

4. The computer-implemented method of claim 1, wherein the higher-level Bloom filter and the lower-level Bloom filters include at least one of a one-dimensional Bloom filter and a two-dimensional Bloom filter.

5. The computer-implemented method of claim 1, wherein comparing the HBFs involves at least one of:
   comparing two write set signatures; and
   comparing a read set signature and a write set signature.

6. The computer-implemented method of claim 1, wherein managing concurrent execution in the computer system involves:
   managing transactional execution in the computer system; or
   providing cache coherence in the computer system.

7. A system for facilitating concurrency control in a computer system, comprising:
 a storage apparatus comprising a set of hierarchical Bloom filters (HBFs) corresponding to a set of signatures associated with memory accesses in the computer system;
 an execution mechanism within a processor configured to:
  create the HBFs, wherein each of the HBFs comprises a higher-level Bloom filter and a set of lower-level Bloom filters referenced using array positions in the higher-level Bloom filter; and
  populate the HBFs using addresses associated with the memory accesses, which comprises:
   calculating a first set of hash values using the addresses;
   using the first set of hash values to calculate a second set of hash values; and
   setting bits in the higher-level Bloom filters in accordance with the first set of hash values and setting the bits in the lower-level Bloom filters in accordance with the second set of hash values; and
 a coherency mechanism associated with the processor, wherein the coherency mechanism is configured to compare the HBFs to detect a potential conflict associated with the memory accesses,
 wherein the execution mechanism is configured to manage concurrent execution in the computer system based on the detected potential conflict.

8. The system of claim 7, wherein a subset of the lower-level Bloom filters is further referenced using array positions in other lower-level Bloom filters.

9. The system of claim 7, wherein comparing the HBFs to detect the potential conflict involves:
 obtaining a bitwise intersection of two of the HBFs; and
 examining array positions in the bitwise intersection for nonzero values.

10. The system of claim 7, wherein the higher-level Bloom filter and the lower-level Bloom filters include at least one of a one-dimensional Bloom filter and a two-dimensional Bloom filter.

11. The system of claim 7, wherein comparing the HBFs involves at least one of:
 comparing two write set signatures; and
 comparing a read set signature and a write set signature.

12. The system of claim 7, wherein managing concurrent execution in the computer system involves:
 managing transactional execution in the computer system; or
 providing cache coherence in the computer system.

13. A non-transitory computer-readable storage medium storing instructions that when executed by a computer cause the computer to perform a method for facilitating concurrency control in a computer system, the method comprising:
 generating a set of signatures associated with memory accesses in the computer system by:
  creating a set of hierarchical Bloom filters (HBFs) corresponding to the signatures, wherein each of the HBFs comprises a higher-level Bloom filter and a set of lower-level Bloom filters referenced using array positions in the higher-level Bloom filter; and
  populating the HBFs using addresses associated with the memory accesses, which comprises:
   calculating a first set of hash values using the addresses;
   using the first set of hash values to calculate a second set of hash values; and
   setting bits in the higher-level Bloom filters in accordance with the first set of hash values and setting the bits in the lower-level Bloom filters in accordance with the second set of hash values;
 comparing the HBFs to detect a potential conflict associated with the memory accesses; and
 managing concurrent execution in the computer system based on the detected potential conflict.

14. The non-transitory computer-readable storage medium of claim 13, wherein comparing the HBFs to detect the potential conflict involves:
 obtaining a bitwise intersection of two of the HBFs; and
 examining array positions in the bitwise intersection for nonzero values.

* * * * *